United States Patent
Capellier

(10) Patent No.: US 12,122,417 B2
(45) Date of Patent: Oct. 22, 2024

(54) DISCRIMINATOR NETWORK FOR DETECTING OUT OF OPERATIONAL DESIGN DOMAIN SCENARIOS

(71) Applicant: Motional AD LLC, Boston, MA (US)

(72) Inventor: Edouard Francois Marc Capellier, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/884,384

(22) Filed: Aug. 9, 2022

(65) Prior Publication Data

US 2024/0051568 A1     Feb. 15, 2024

(51) Int. Cl.
*B60W 60/00* (2020.01)
*G06N 3/0475* (2023.01)
*G06N 3/094* (2023.01)

(52) U.S. Cl.
CPC ......... *B60W 60/001* (2020.02); *G06N 3/0475* (2023.01); *G06N 3/094* (2023.01); *B60W 2556/35* (2020.02)

(58) Field of Classification Search
CPC ............... B60W 60/001; B60W 50/14; B60W 60/0011; B60W 30/16; B60W 60/00; B60W 50/08; G01C 21/26; G01C 21/00; G06V 10/82; G06K 9/00362; G06K 9/00; G06N 3/0475; G06N 20/00; G05B 9/02
See application file for complete search history.

(56) References Cited

U.S. PATENT DOCUMENTS 10,262,236 B2 * 4/2019 Lim ................ G06F 18/28
11,375,242 B1 * 6/2022 Said ................ H04N 19/44
11,594,016 B1 * 2/2023 Zhou ............... G06V 10/82
(Continued)

FOREIGN PATENT DOCUMENTS

CN      105574511 A * 5/2016 ......... G06K 9/00362
WO  WO-2022035373 A1 * 2/2022 ............. G01C 21/26

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
(Continued)

*Primary Examiner* — Yuri Kan
(74) *Attorney, Agent, or Firm* — Fish & Richardson P.C.

(57) ABSTRACT

Provided are methods for detecting when a vehicle is encountering an out of operational design domain (ODD) scenario, which can include training a generative adversarial network (GAN) including a generator network and a discriminator network. The generator network may be trained to generate synthesized scenarios. The discriminator network may be trained to distinguish between true scenarios and the synthesized scenarios generated by the generator network. The trained discriminator network may be applied to detect when a vehicle encounters an out of operational design domain (ODD) scenario. Some methods described also include controlling the motion of the vehicle in response to an output of the trained discriminator network indicating that the vehicle is encountering the out of operational design domain (ODD) scenario. Systems and computer program products are also provided.

28 Claims, 10 Drawing Sheets

(56) References Cited

U.S. PATENT DOCUMENTS

| | | | |
|---|---|---|---|
| 2017/0349185 A1* | 12/2017 | McNew | B60W 30/16 |
| 2018/0253866 A1* | 9/2018 | Jain | G06F 18/2431 |
| 2019/0176818 A1* | 6/2019 | Movert | G06N 3/045 |
| 2019/0179328 A1* | 6/2019 | Movert | B60W 50/0097 |
| 2020/0151577 A1* | 5/2020 | Ogawa | G06Q 20/4016 |
| 2020/0225683 A1 | 7/2020 | Alvarez et al. | |
| 2020/0242477 A1* | 7/2020 | Kim | G08G 1/0133 |
| 2020/0247432 A1 | 8/2020 | Misra et al. | |
| 2020/0353943 A1 | 11/2020 | Siddiqui et al. | |
| 2020/0372618 A1* | 11/2020 | Zhang | G06N 3/088 |
| 2021/0042627 A1* | 2/2021 | Kapoor | G06N 3/088 |
| 2021/0073584 A1 | 3/2021 | St Romain, II et al. | |
| 2021/0192762 A1* | 6/2021 | Guan | G06V 20/64 |
| 2021/0237767 A1 | 8/2021 | Khoreva et al. | |
| 2021/0255300 A1* | 8/2021 | Harrison | G01S 13/584 |
| 2021/0273857 A1* | 9/2021 | Larish | G06N 3/045 |
| 2021/0279841 A1* | 9/2021 | Liu | G06V 10/54 |
| 2021/0286068 A1* | 9/2021 | Kumar | G01S 13/931 |
| 2021/0334645 A1* | 10/2021 | Pardeshi | G06N 3/08 |
| 2021/0374402 A1* | 12/2021 | Kim | G06V 40/19 |
| 2021/0406722 A1* | 12/2021 | Armstrong-Crews | G06N 3/045 |
| 2022/0004846 A1* | 1/2022 | Fukuda | G06F 21/32 |
| 2022/0012596 A1* | 1/2022 | Nie | G06T 11/60 |
| 2022/0055488 A1* | 2/2022 | Aslandere | G06N 3/045 |
| 2022/0076119 A1* | 3/2022 | Khoreva | G06F 18/217 |
| 2022/0084204 A1* | 3/2022 | Li | G06N 3/08 |
| 2022/0101146 A1* | 3/2022 | el Kaliouby | G06N 3/08 |
| 2022/0126864 A1* | 4/2022 | Moustafa | B60W 50/14 |
| 2022/0161815 A1* | 5/2022 | Van Beek | B60W 60/0011 |
| 2022/0261590 A1* | 8/2022 | Brahma | G01S 17/89 |
| 2022/0357155 A1* | 11/2022 | Fujita | G01B 11/22 |
| 2022/0413502 A1* | 12/2022 | Keski-Valkama | G05D 1/0088 |
| 2023/0004760 A1* | 1/2023 | Mustikovela | G06F 18/24 |
| 2023/0021338 A1* | 1/2023 | Ahuja | G06N 3/08 |
| 2023/0052339 A1* | 2/2023 | Saxena | G06N 3/08 |

OTHER PUBLICATIONS

International Search Report and Written Opinion in International Appln. No. PCT/US2023/029216, mailed on Oct. 19, 2023, 13 pages.

Isola et al., "Image-to-Image Translation with Conditional Adversarial Networks," revised Nov. 26, 2018, arXiv: 1611.07004, 17 pages.

* cited by examiner

DISCRIMINATOR NETWORK FOR DETECTING OUT OF OPERATIONAL DESIGN DOMAIN SCENARIOS

BACKGROUND

An autonomous vehicle is capable of sensing and navigating through its surrounding environment with minimal to no human input. To safely navigate the vehicle along a selected path, the vehicle may rely on a motion planning process to generate, update, and execute one or more trajectories through its immediate surroundings. The trajectory of the vehicle may be generated based on the current condition of the vehicle itself and the conditions present in the vehicle's surrounding environment, which may include mobile objects such as other vehicles and pedestrians as well as immobile objects such as buildings and street poles. For example, the trajectory may be generated to avoid collisions between the vehicle and the objects present in its surrounding environment. Moreover, the trajectory may be generated such that the vehicle operates in accordance with other desirable characteristics such as path length, ride quality or comfort, required travel time, observance of traffic rules, adherence to driving practices, and/or the like.

DETAILED DESCRIPTION

Figure 1:
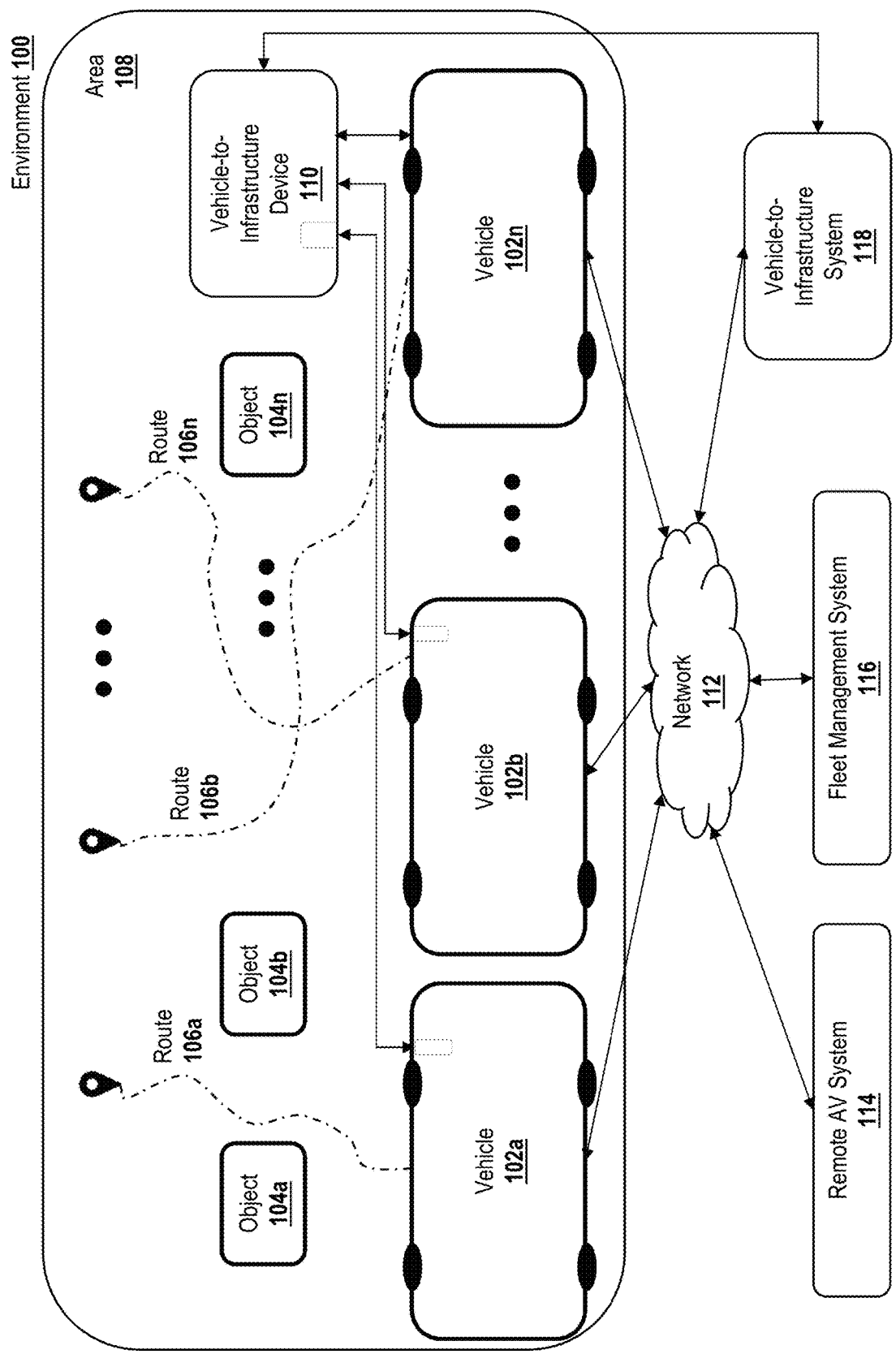
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a machine learning enabled technique for detecting when a vehicle (e.g., an autonomous vehicle) encounters an out of operational design domain (ODD) scenario that includes one or more conditions (e.g., location, speed, weather, type of roads, type of obstacles, and/or the like) outside of the vehicle's design. For example, a generative adversarial network (GAN), which includes a generator network and a discriminator network, may be trained by training the generator network to generate one or more synthesized scenarios and the discriminator network to distinguish between at least one true scenario originating from the perception system of an autonomous vehicle and the one or more synthesized scenarios generated by the generator network. The trained discriminator network may be applied to detect when the vehicle encounters an out of operational design domain (ODD) scenario such that the motion of the vehicle may be controlled to respond to when the vehicle is encountering the out of operational design domain (ODD) scenario.

By virtue of the implementation of systems, methods, and computer program products described herein, techniques for detecting when a vehicle (e.g., an autonomous vehicle) encounters an out of operational design domain (ODD) scenario enable the deployment of suitable countermeasures, which may be necessary to safely navigates its surrounding environment while maintaining desirable operational characteristics such as path length, ride quality or comfort, required travel time, observance of traffic rules, adherence to driving practices, and/or the like. Existing solutions, which rely on sensor models or statistical analysis of the neural networks used to process sensor data from the perception system of the vehicle, are cumbersome and difficult to scale when the scope of out of operational design domain (ODD) expands. Contrastingly, various implementations of the out of operational design domain (ODD) scenario detection techniques described herein employ the discriminator network of a trained generative adversarial network to process sensor data from the perception system of the vehicle directly. This discriminator network, which operates on an abstract level, is nimble as well as easy to retrain. For example, the scope of out of operational design domain may be expanded by simply retraining the generative adversarial network (GAN) on new driving logs.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
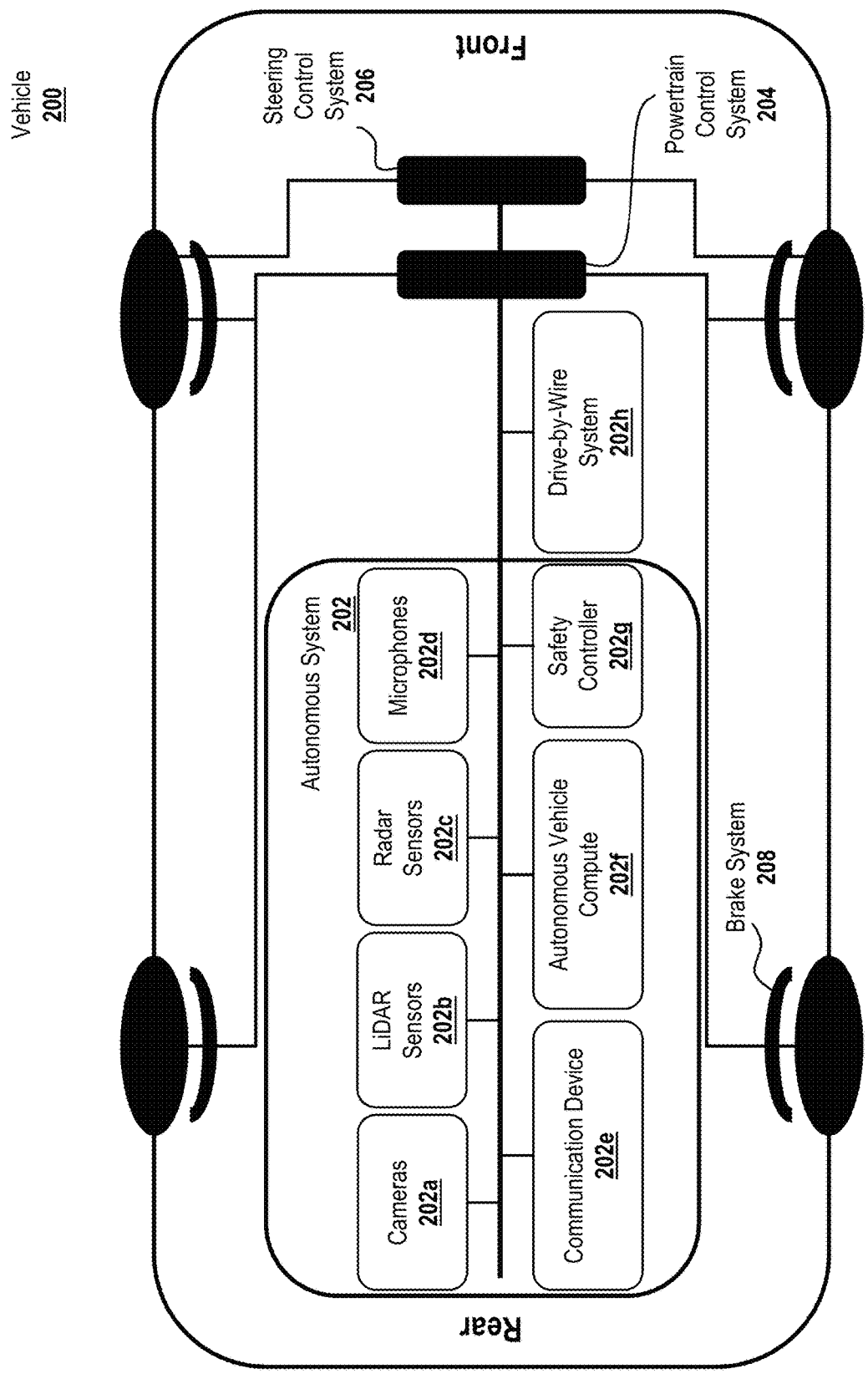
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
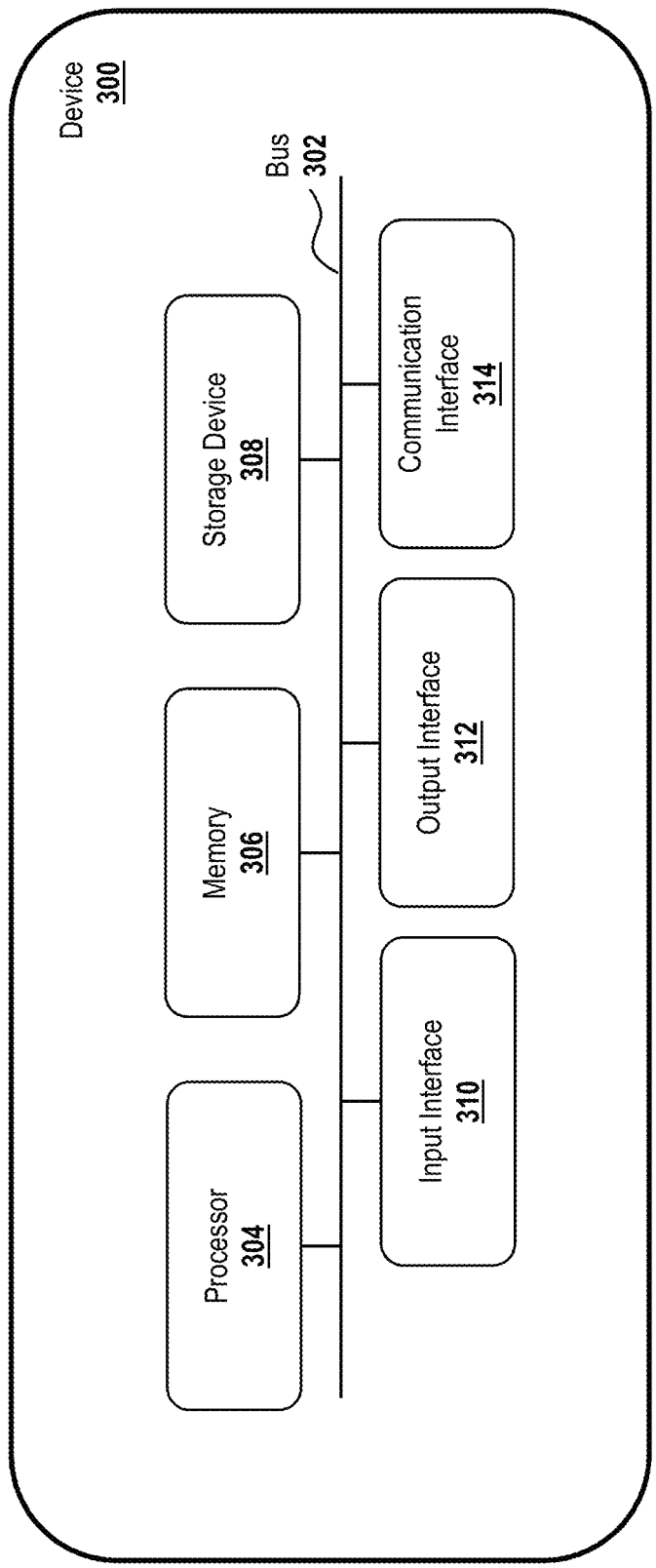
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of the vehicle 200 (e.g., at least one device of the autonomous system 202, the powertrain control system 204, the steering control system 206, and/or the brake system 208 of the vehicle 200), and/or one or more devices of network 112 (e.g., one or more devices of a system of network 112). In some embodiments, one or more devices of vehicles 102 (e.g., one or more devices of a system of vehicles 102), the vehicle 200, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
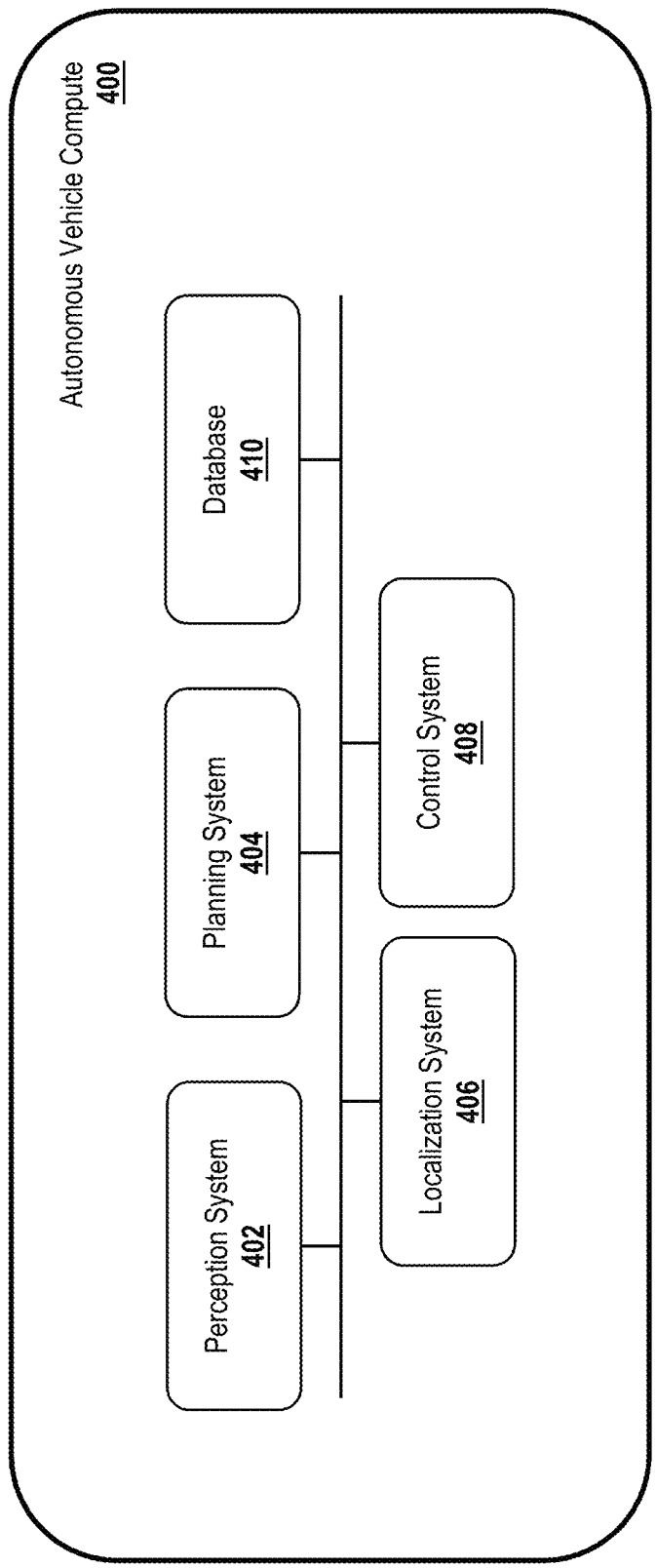
FIG. 4A is a diagram of certain components of an autonomous system.
Figure 4B:
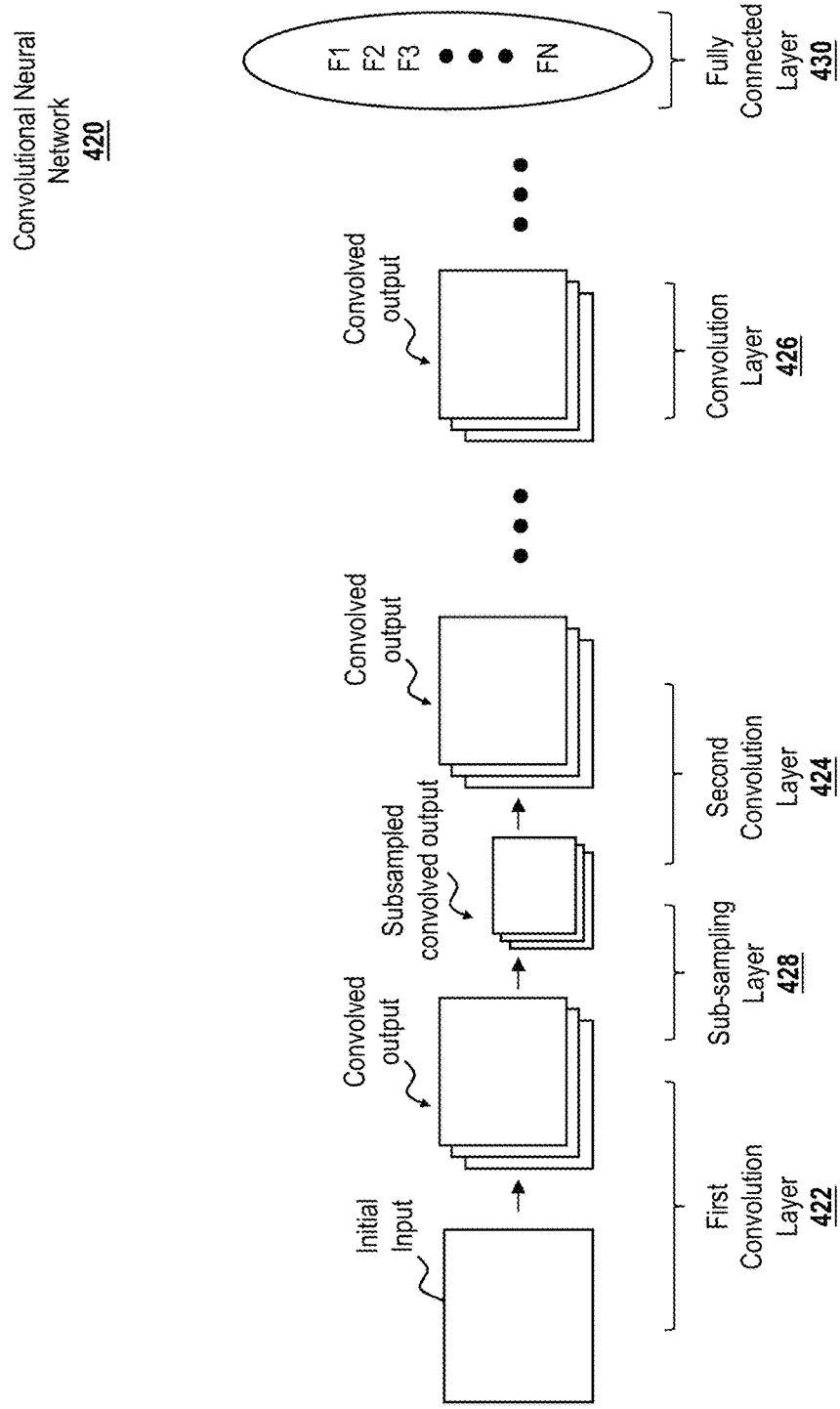
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. For example, the CNN 420 may implement the generator network and/or the discriminator network of a generative adversarial network (GAN) trained to detect out of operational design domain (ODD) scenarios. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
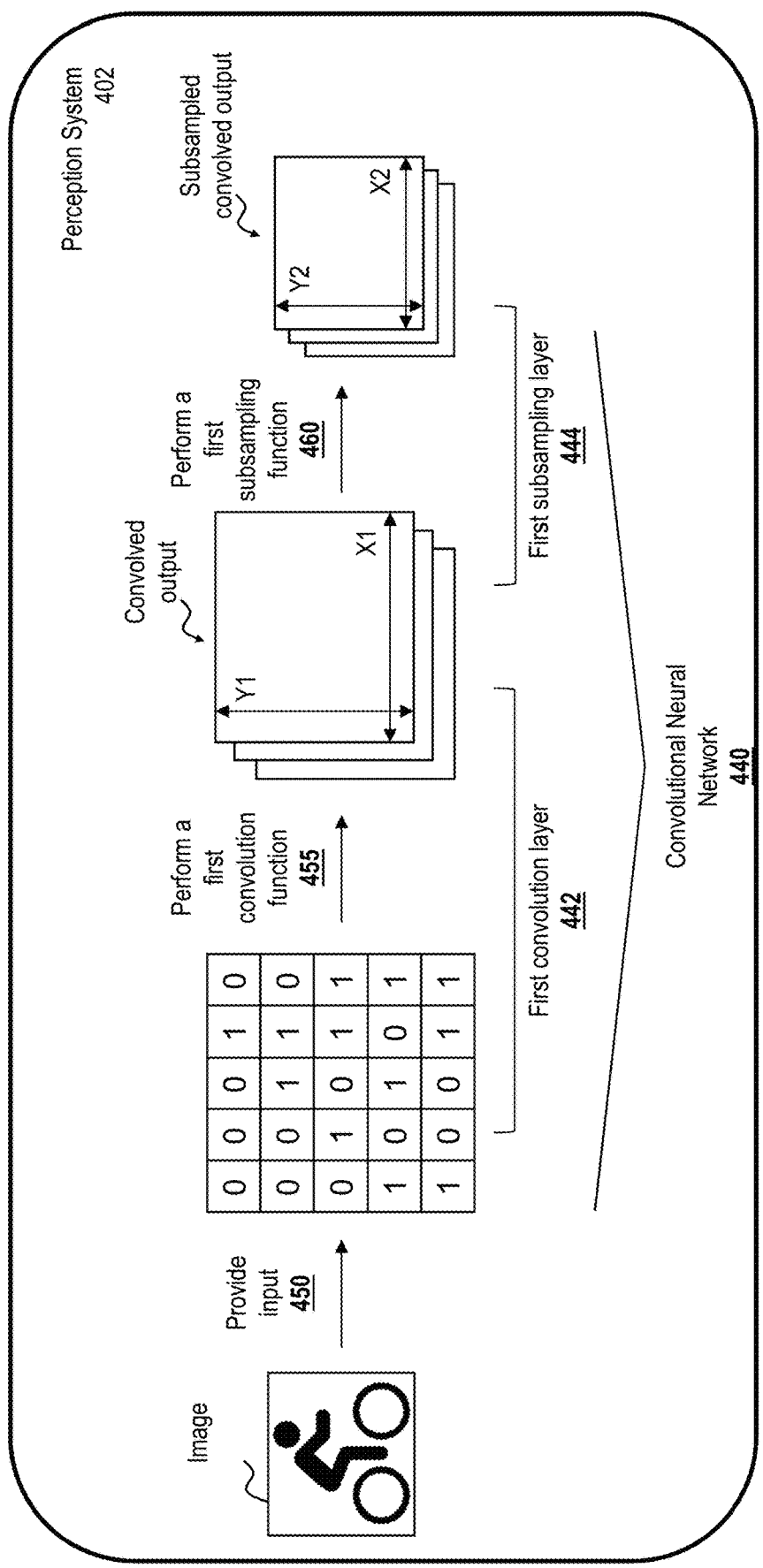
FIGS. 4C and 4D are a diagram illustrating example operation of a CNN.
Figure 4D:
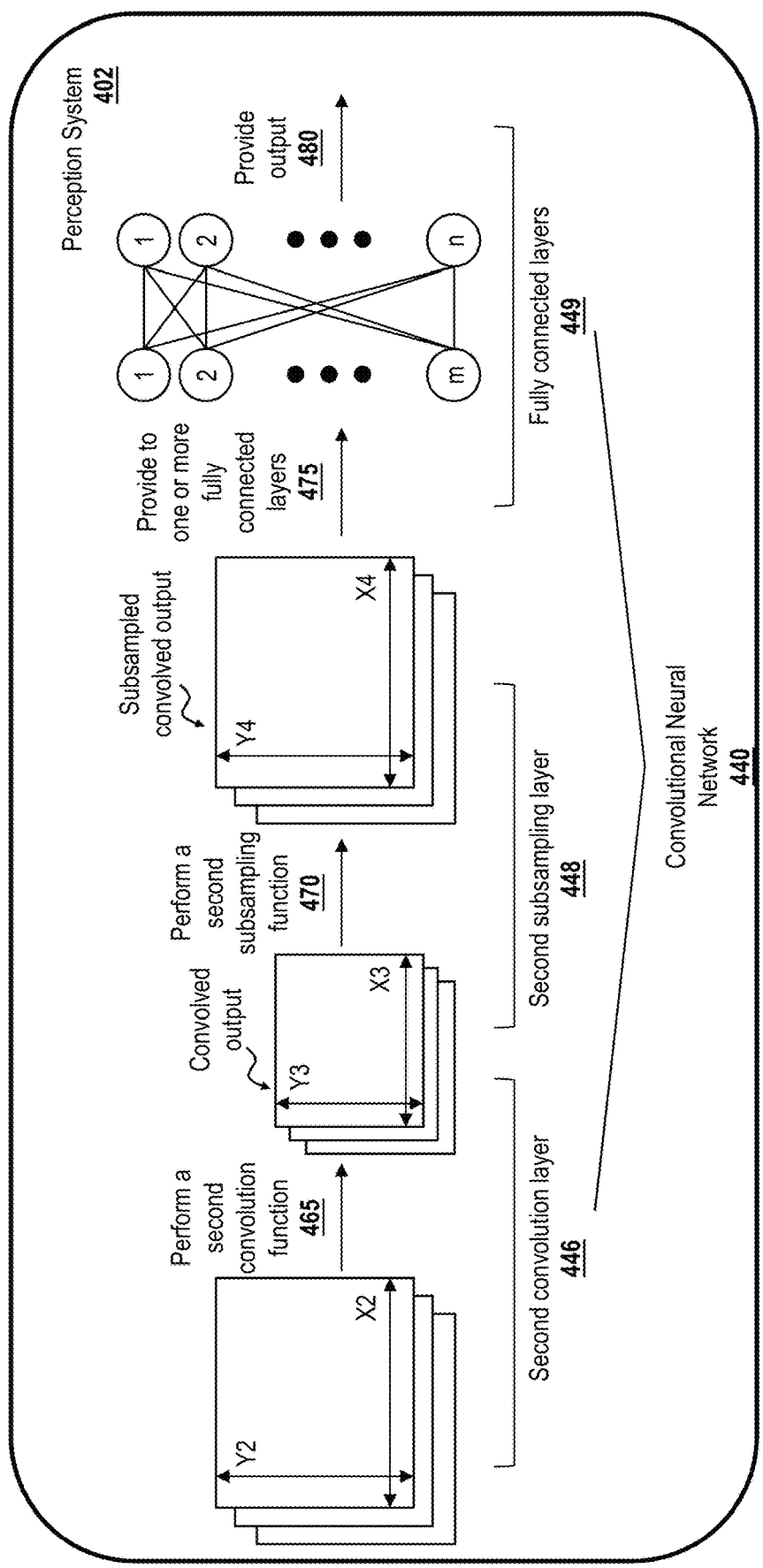

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first sub sampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second sub sampling layer 448. In some embodiments, CNN 440 adds a bias value to the aggregates of all the values provided to each neuron of the downstream layer. For example, CNN 440 adds a bias value to the aggregates of all the values provided to each neuron of second sub sampling layer 448. In such an example, CNN 440 determines a final value to provide to each neuron of second subsampling layer 448 based on the aggregates of all the values provided to each neuron and an activation function associated with each neuron of second sub sampling layer 448.

At step 470, CNN 440 performs a second subsampling function. For example, CNN 440 can perform a second subsampling function based on CNN 440 providing the values output by second convolution layer 446 to corresponding neurons of second sub sampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second sub sampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5A:
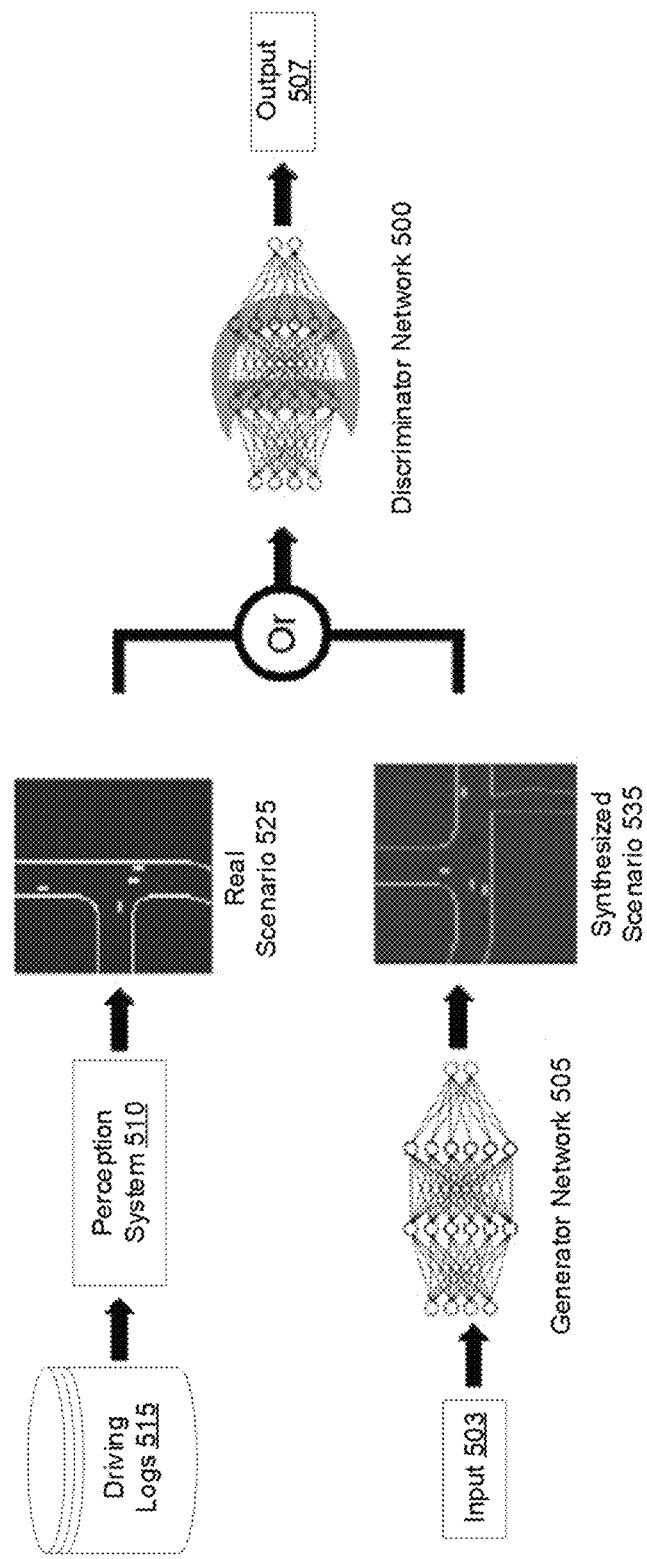
FIG. 5A is a schematic diagram of an example of a discriminator network being trained to detect out of operational design domain (ODD) scenarios.
Figure 5B:
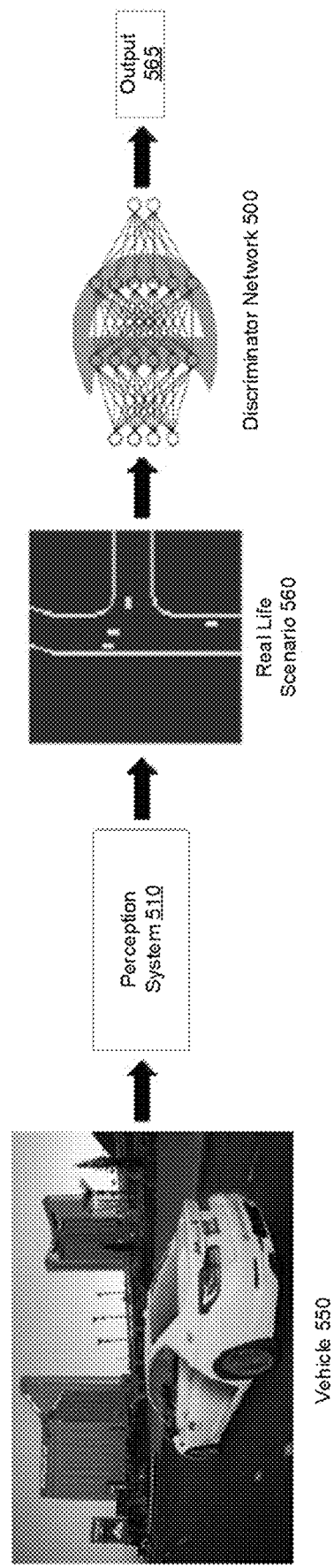
FIG. 5B is a schematic diagram of an example of a discriminator network deployed to detect out of operational design domain scenarios.

Referring now to FIGS. 5A-B, illustrated are schematic diagrams of an example of a discriminator network 500 of a generative adversarial network being trained and deployed to detect when a vehicle 550 (e.g., an autonomous vehicle such as the vehicles 102 shown in FIG. 1, the vehicle 200 shown in FIG. 2, and/or the like) encounters an out of operational design domain (ODD) scenario. In some example embodiments, the discriminator network 500 may be trained offline before being deployed to detect when the vehicle 550 encounters an out of operational design domain (ODD) scenario. In some example embodiments, once deployed to the vehicle 550, the discriminator network 500 may operate on perception outputs from a perception system 510, which may be the same as or similar to the perception system 402 described above.

FIG. 5A depicts a schematic diagram of the discriminator network 500 being trained to detect out of operational design domain (ODD) scenarios. As shown in FIG. 5A, the discriminator network 500 may form a part of a generative adversarial network (GAN) that also includes a generator network 505. In some example embodiments, the generative adversarial network (GAN) may be trained by at least training the generator network 505 to generate, for example, based on an input 503, one or more synthesized scenarios 535 that emulate real scenarios, such as the real scenarios 525 originating from the perception system 510, as much as possible. Examples of the input 503 include one or more of a random noise, a map, a raw sensor data, and/or the like.

While the generator network 505 is being trained to generate the one or more synthesized scenarios 535, the discriminator network 500 may be simultaneously trained to differentiate between the real scenarios 525 from the perception system 510 and the synthesized scenarios 535 generated by the generator network 505. In some cases, the real scenarios 525 may be reproduced by the perception system 510 based on one or more driving logs 515. Accordingly, the discriminator network 500 may be updated, for example, to update the scope of out of operational design domain (ODD) scenarios, by at least retraining the generative adversarial network (GAN) using new and/or additional driving logs in the manner shown in FIG. 5A. As shown in FIG. 5A, the discriminator network 500 may generate an output 507 indicating, for each scenario input into the discriminator network 500, a probability of the scenario being a real scenario (or a synthesized scenario).

Upon being trained in the manner shown in FIG. 5A, the discriminator network 500 may be deployed to detect, for example, when the vehicle 550 encounters an out of operational design domain (ODD) scenario. For instance, in the example deployment shown in FIG. 5B, the discriminator network 500 may receive, from the perception system 510 of the vehicle 550, a real life scenario 560. The discriminator network 500 may generate, based at least on the real life scenario 560, an output 565 indicating a probability of the real life scenario 560 being an out of operational design domain (ODD) scenario. In some example embodiments, one or more countermeasures may be triggered in response to the output 565 of the discriminator network 500 indicating that the vehicle 550 is encountering an outer of operational design domain (ODD) scenario. One example countermeasure includes controlling the motion of the vehicle, for instance, through the control signals transmitted by the control system 408 to the drive-by-wire (DBW) system 202h, the powertrain control system 204, the steering control system 206, and/or the brake system 208, to decelerate and/or break when the vehicle 550 is encountering an out of operational design domain (ODD) scenario. Alternatively and/or additionally, a remote vehicle assistance (RVA) request may be sent in response to the vehicle 550 encountering an out of operational design domain (ODD) scenario.

In some example embodiments, the output 565 of the discriminator network 500 may be determined based on multiple probabilities of the vehicle 550 being in an out of operational design domain (ODD) scenario at different locations and/or for different time periods. For example, the discriminator network 500 may determine, for a first time period and/or a first location, a first probability of the vehicle being in an out of operational design domain (ODD) scenario. Furthermore, the discriminator network 500 may determine, for a second time period and/or a second location, a second probability of the vehicle being in an out of operational design domain scenario. Accordingly, the output 565 of the discriminator network 500 may be generated by fusing together the first probability and the second probability, for example, by applying Bayesian fusion, Dempster-Shafer fusion, Yager's combination rule, Dubois-Prade combination rule, Denoeux's cautious rule, and/or the like. The application of Bayesian fusion may include applying Bayes estimation algorithm (e.g., if the observations are independent) or ad hoc operators. For instance, a pessimistic approach may include taking the maximum probabilities of being out of operational design domain (ODD) over time, an optimistic approach may include taking the minimum probabilities of being out of operational design domain (ODD) over time, and an ad hoc approach may include taking the average probabilities of being out of operational design domain (ODD) over time. When fusing together a current observation with one or more previous observations, the one or more previous observations may be associated with less (or a discounted) evidential mass value. The fusion of multiple observations may at least increase the robustness of the discriminator network 500, meaning that the output 565 of the discriminator network 500 exhibits a low variance when applied to new input scenarios.

In some example embodiments, instead of or in addition to a single probability of the real life scenario 560 being an out of operational design domain (ODD) scenario, the output 565 of the discriminator network 500 may be a probability map in which each region of a plurality of regions is associated with a probability of the region being out of operational design domain (ODD). For example, the output 565 of the discriminator network 500 may be a probability map in which a first region is associated with a first probability of the first region being out of operational design domain (ODD) and a second region is associated with a second probability of the second region being out of operational design domain (ODD). Where the output 565 of the discriminator network 500 is a probability map, the countermeasures triggered by the output 565 of the discriminator network 500 may include controlling the motion of the vehicle 550 to avoid, based at least on the probability map included in the output 565 of the discriminator network 500, one or more regions having an above-threshold probability being out of operational design domain (ODD).

In some example embodiments, the output 565 of the discriminator network 500 may also trigger updates to the perception system 510 of the vehicle 550. For example, for at least some scenarios where the output 565 of the discriminator network 500 indicates as having an above-threshold probability of being a synthesized scenario, the perception system 510 of the vehicle 550 may be updated to recognize these scenarios such that these scenarios are no longer out of operational design domain (ODD). In some cases, the threshold associated with the vehicle 550 encountering a synthesized scenario may be lower than the threshold associated with the vehicle 550 being in an out of operational design domain (ODD) scenario such that that the perception system 510 is fine tuned to better respond to uncertain situations in which the vehicle 550 is in a scenario that is unfamiliar but not out of the existing operational design domain (ODD) of the perception system 510.

In some example embodiments, the output 565 of the discriminator network 500 may be used to gauge the difficulty of deploying a fleet including, for example, the vehicle 550, in a new location. For instance, the output 565 of the discriminator network 500 may be used to determine the quantity of out of operational design domain (ODD) scenarios encountered by the vehicle 550 while the vehicle 550 is navigating in a new location. The quantity of out of operational design domain (ODD) scenarios encountered by the vehicle 550 in the new location may be indicative of the difficulty associated with deploying the vehicle 550 in the new location. Accordingly, where the vehicle 550 encounters a larger quantity of out of operational design domain (ODD) in the new location, deployment may be more difficult as the perception system 510 of the vehicle 550 may require more significant updates in order to for the vehicle 550 to successfully navigate the new location.

In some example embodiments, the output 565 of the discriminator network 500 may undergo refinements to increase its accuracy and robustness. For example, in some cases, the output 565 of the discriminator network 500 may be adjusted based on an uncertainty associated with the output 565 of the discriminator network 500. The uncertainty associated with the output 565 of the discriminator network 500 may correspond to an uncertainty associated with a first probability of the vehicle 550 being in an out of operational design domain (ODD) scenario and/or a second probability of the vehicle 550 not being in an out of operational design domain (ODD) scenario. Moreover, the uncertainty associated with the output 565 of the discriminator network 500 may be determined in a variety of ways including, for example, by applying an evidential classification, a temperature scaling for probability calibration, and/or the like.

Figure 6:
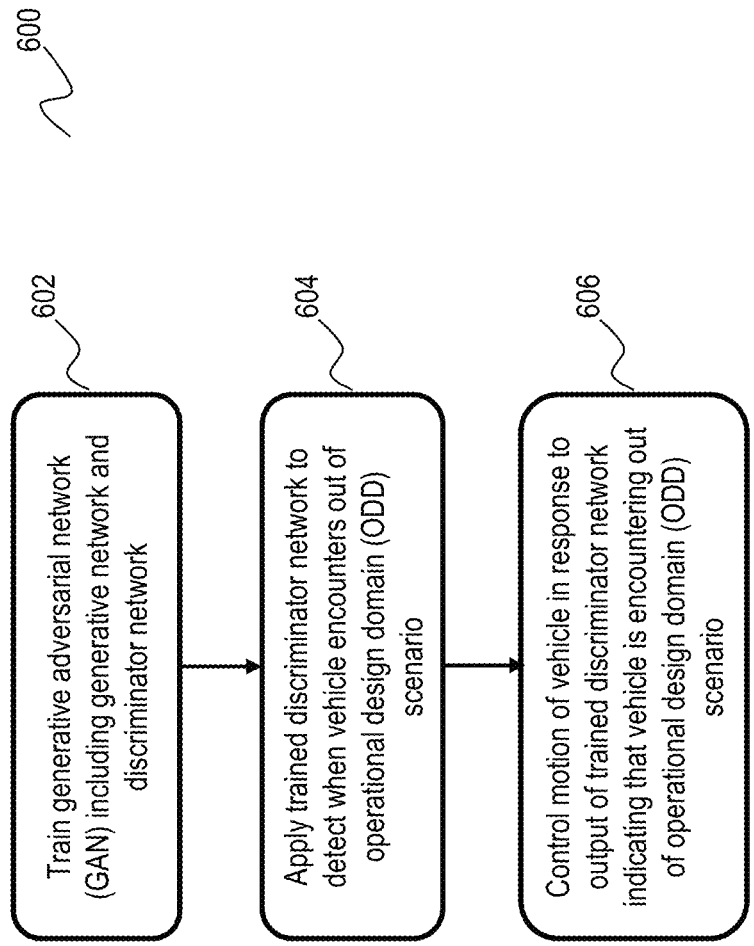
FIG. 6 is a flowchart of a process for detecting out of operational design domain scenarios.

Referring now to FIG. 6, illustrated is a flowchart of a process 600 for detecting out of operational design domain (ODD) scenarios. In some embodiments, one or more of the steps described with respect to process 600 are performed (e.g., completely, partially, and/or the like) by the autonomous system 202 of the vehicle 200. Additionally, or alternatively, in some embodiments one or more steps described with respect to process 600 are performed (e.g., completely, partially, and/or the like) by another device or group of devices separate from or including autonomous system 202 of the vehicle 200 such as the device 300.

With continued reference to FIG. 6, a generative adversarial network (GAN) including a generative network and a discriminator network may be trained (block 602). For example, as shown in FIG. 5A, the discriminator network 500 of a generative adversarial network (GAN) may be trained alongside the generator network 505 of the generative adversarial network (GAN). The generator network 505 to may be trained to generate, based on the input 503 (including one or more of a random noise, a map, a raw sensor data, and/or the like), one or more synthesized scenarios 535 that emulate real scenarios, such as the real scenarios 525 originating from the perception system 510, as much as possible. Meanwhile, the discriminator network 500 may be trained to differentiate between the real scenarios 525 from the perception system 510 and the synthesized scenarios 535 generated by the generator network 505.

With continued reference to FIG. 6, the trained discriminator network may be applied to detect when a vehicle encounters an out of operational design domain (ODD) scenario (block 604). For example, the trained discriminator network 500 may be deployed to detect when the vehicle 550 is encountering an out of operational design domain scenario. In the example deployment shown in FIG. 5B, the discriminator network 500 may generate, based at least on the real life scenario 560 (e.g., received from the perception system 510 of the vehicle 550), the output 565 indicating a probability of the real life scenario 560 being an out of operational design domain (ODD) scenario. In some cases, the output 565 of the discriminator network 500 may be determined based on multiple probabilities of the vehicle 550 being in an out of operational design domain (ODD) scenario at different locations and/or for different time periods. Alternatively and/or additionally, the output 565 of the discriminator network 500 may be a probability map in which each region of a plurality of regions is associated with a probability of the region being out of operational design domain (ODD). The output 565 of the discriminator network 500 may also undergo certain refinements to increase its accuracy and robustness. For instance, in some cases, the output 565 of the discriminator network 500 may be adjusted based on an uncertainty associated with the output 565 of the discriminator network 500, which may be determined by applying an evidential classification, a temperature scaling for probability calibration, and/or the like.

Some example techniques for determining the uncertainty in the output 565 of the discriminator network 500 include computing the entropy of the probabilities of the vehicle 550 being in an out of operational design (ODD) scenario. This may include applying Monte-Carlo dropout to vary probabilities of being out of operational design domain (ODD) determined by the discriminator network 500. The output 565 of the discriminator network 500 may thus correspond to the average of the different probabilities, which may be associated with an overall uncertainty score corresponding to the standard deviation amongst the different probabilities determined by the discriminator network 500. The application of evidential classification and temperature scaling on the output 565 of the discriminator network 500 may reduce extreme variations in the output of the 565. For example, the output 565 of the discriminator network 500 may include highly contrasted probabilities that are close to either 0 or 1. Temperature scaling renders the probabilities included in the output 565 of the discriminator network 500 more nuanced and evenly distributed throughout the [0,1] range. Meanwhile, with evidential classification, the output 565 of the discriminator network 500 may include three separate instead of a single probabilities (e.g., evidence of being in operational design domain (ODD), evidence of being out of operational design domain (ODD), and overall uncertainty on the previous assignments).

With continued reference to FIG. 6, the motion of the vehicle may be controlled in response to the output of the trained discriminator network indicating that the vehicle is encountering the out of operational design domain (ODD) scenario (block 606). In some example embodiments, one or more countermeasures may be triggered when the output 565 of the discriminator network 500 indicates that the vehicle 550 is encountering an out of operational design domain (ODD) scenario. One example countermeasure includes controlling the motion of the vehicle 550 to decelerate and/or break when the vehicle 550 is encountering an out of operational design domain (ODD) scenario. Alternatively and/or additionally, a remote vehicle assistance (RVA) request may be sent in response to the vehicle 550 encountering an out of operational design domain (ODD) scenario. In some cases, the one or more countermeasures may include avoiding one or more regions identified based on the output 565 of the discriminator network 500 as having an above-threshold probability being out of operational design domain (ODD). Furthermore, in some cases, the one or more countermeasures may include updating the perception system 510 of the vehicle 550. For instance, the perception system 510 of the vehicle 550 may be fine-tuned to recognize scenarios that are unfamiliar (e.g., having an above-threshold probability of being a synthesized scenario according to the output 565 of the discriminator network 500) but not necessarily out of the existing operational design domain (ODD) of the perception system 510.

According to some non-limiting embodiments or examples, provided is a system, comprising: at least one data processor and at least one memory storing instructions. The executing of the instructions by the at least one data processor causes the at least data processor to at least: apply, using at least one data processor, a discriminator network of a generative adversarial network (GAN) to detect when a vehicle encounters an out of operational design domain (ODD) scenario, the generative adversarial network (GAN) including a generator network and the discriminator network, the generator network being trained to generate one or more synthesized scenarios, and the discriminator network being trained to distinguish between at least one true scenario and the one or more synthesized scenarios generated by the generator network; and control a motion of the vehicle in response to an output of the trained discriminator network indicating that the vehicle is encountering the out of operational design domain (ODD) scenario.

According to some non-limiting embodiments or examples, provided is at least one non-transitory computer-readable medium comprising one or more instructions that, when executed by at least one processor, cause the at least one processor to: apply, using at least one data processor, a discriminator network of a generative adversarial network (GAN) to detect when a vehicle encounters an out of operational design domain (ODD) scenario, the generative adversarial network (GAN) including a generator network and the discriminator network, the generator network being trained to generate one or more synthesized scenarios, and the discriminator network being trained to distinguish between at least one true scenario and the one or more synthesized scenarios generated by the generator network; and control a motion of the vehicle in response to an output of the trained discriminator network indicating that the vehicle is encountering the out of operational design domain (ODD) scenario.

According to some non-limiting embodiments or examples, provided is a method, comprising: applying, using at least one data processor, a discriminator network of a generative adversarial network (GAN) to detect when a vehicle encounters an out of operational design domain (ODD) scenario, the generative adversarial network (GAN) including a generator network and the discriminator network, the generator network being trained to generate one or more synthesized scenarios, and the discriminator network being trained to distinguish between at least one true scenario and the one or more synthesized scenarios generated by the generator network; and controlling, using the at least one data processor, a motion of the vehicle in response to an output of the trained discriminator network indicating that the vehicle is encountering the out of operational design domain (ODD) scenario.

Further non-limiting aspects or embodiments are set forth in the following numbered clauses:

Clause 1: A method comprising: applying, using at least one data processor, a discriminator network of a generative adversarial network (GAN) to detect when a vehicle encounters an out of operational design domain (ODD) scenario, the generative adversarial network (GAN) including a generator network and the discriminator network, the generator network being trained to generate one or more synthesized scenarios, and the discriminator network being trained to distinguish between at least one true scenario and the one or more synthesized scenarios generated by the generator network; and controlling, using the at least one data processor, a motion of the vehicle in response to an output of the trained discriminator network indicating that the vehicle is encountering the out of operational design domain (ODD) scenario.

Clause 2: The method of clause 1, wherein the generative adversarial network (GAN) is trained to generate the one or more synthesized scenarios based at least on one or more driving logs representative of one or more true scenarios.

Clause 3: The method of any of clauses 1 to 2, further comprising: sending, using the at least one data processor, a remote vehicle assistance (RVA) request in response to the output of the trained discriminator network indicating that the vehicle is encountering the out of operational design domain (ODD) scenario.

Clause 4: The method of any of clauses 1 to 3, wherein the controlling the motion of the vehicle in response to the vehicle encountering the out of operational design domain (ODD) scenario includes at least one of decelerating and braking.

Clause 5: The method of any of clauses 1 to 4, wherein the trained discriminator network outputs a probability map in which each region of a plurality of regions is associated with a probability of the region being out of operational design domain (ODD).

Clause 6: The method of clause 5, wherein controlling the motion of the vehicle includes avoiding, based at least on the probability map output by the trained discriminator network, one or more regions of the plurality of regions having an above-threshold probability being out of operational design domain (ODD).

Clause 7: The method of any of clauses 1 to 6, wherein the generative adversarial network (GAN) is trained based on training data comprising one or more of a random noise, a map, and raw sensor data.

Clause 8: The method of any of clauses 1 to 7, further comprising: identifying, using the at least one data processor and based at least on an output of the trained discriminator network, one or more scenarios encountered by the vehicle that have an above-threshold probability of being a synthesized scenario; and updating, using the at least one data processor and based at least on the one or more scenarios, a perception system of the vehicle.

Clause 9: The method of any of clauses 1 to 8, further comprising: determining, using the at least one data processor and based at least on the output of the trained discriminator network, a quantity of out of operational design domain (ODD) scenarios encountered by the vehicle in a new location.

Clause 10: The method of any of clauses 1 to 9, wherein the trained discriminator network outputs a first probability of the vehicle being in the out of operational design domain scenario for a first time period and/or a first location, wherein the trained discriminator network further outputs a second probability of the vehicle being in the out of operational design domain scenario for a second time period and/or a second location, and wherein the output of the trained discriminator network is determined based at least on the first probability and the second probability.

Clause 11: The method of clause 10, wherein the output of the trained discriminator network is determined by fusing at least the first probability and the second probability.

Clause 12: The method of clause 11, wherein the first probability and the second probability are fused by applying one or more of Bayesian fusion, Dempster-Shafer fusion, Yager's combination rule, Dubois-Prade combination rule, Denoeux's cautious rule.

Clause 13: The method of any of clauses 1 to 12, further comprising: determining an uncertainty associated with the output of the trained discriminator network; and adjusting, based at least on the uncertainty, the output of the trained discriminator network.

Clause 14: The method of clause 13, wherein the uncertainty associated with the output of the trained discriminator network comprises an uncertainty associated with a first probability of the vehicle being in the out of operational design domain (ODD) scenario and/or a second probability of the vehicle not being in the out of operational design domain (ODD) scenario.

Clause 15: The method of any of clauses 13 to 14, wherein the uncertainty associated with the output of the trained discriminator network is determined by applying an evidential classification and/or a temperature scaling for probability calibration.

Clause 16: The method of any of causes 1 to 15, further comprising: training, using at least one data processor, the generative adversarial network (GAN) including the generator network and the discriminator network.

Clause 17: A system, comprising: at least one data processor, and at least one memory storing instructions, which when executed by the at least one data processor, result in operations comprising any of clauses 1 to 16.

Clause 18: A non-transitory computer readable medium storing instructions, which when executed by at least one data processor, result in operations comprising any of clauses 1 to 16.

Clause 19: A method, comprising: training, using at least one data processor, a generative adversarial network (GAN) including a generator network and a discriminator network, the generator network being trained to generate one or more synthesized scenarios, and the discriminator network being trained to distinguish between at least one true scenario and the one or more synthesized scenarios generated by the generator network; applying, using the at least one data processor, the trained discriminator network to detect when a vehicle encounters an out of operational design domain (ODD) scenario; and controlling, using the at least one data processor, a motion of the vehicle in response to an output of the trained discriminator network indicating that the vehicle is encountering the out of operational design domain (ODD) scenario.

Clause 20: A system, comprising: at least one data processor, and at least one memory storing instructions, which when executed by the at least one data processor, result in operations comprising: training, using at least one data processor, a generative adversarial network (GAN) including a generator network and a discriminator network, the generator network being trained to generate one or more synthesized scenarios, and the discriminator network being trained to distinguish between at least one true scenario and the one or more synthesized scenarios generated by the generator network; applying, using the at least one data processor, the trained discriminator network to detect when a vehicle encounters an out of operational design domain (ODD) scenario; and controlling, using the at least one data processor, a motion of the vehicle in response to an output of the trained discriminator network indicating that the vehicle is encountering the out of operational design domain (ODD) scenario.

Clause 21: A non-transitory computer readable medium storing instructions, which when executed by at least one data processor, result in operations comprising: training, using at least one data processor, a generative adversarial network (GAN) including a generator network and a discriminator network, the generator network being trained to generate one or more synthesized scenarios, and the discriminator network being trained to distinguish between at least one true scenario and the one or more synthesized scenarios generated by the generator network; applying, using the at least one data processor, the trained discriminator network to detect when a vehicle encounters an out of operational design domain (ODD) scenario; and controlling, using the at least one data processor, a motion of the vehicle in response to an output of the trained discriminator network indicating that the vehicle is encountering the out of operational design domain (ODD) scenario.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    receiving a scenario comprising conditions encountered by a vehicle as it navigates in an environment, wherein a condition comprises at least one of a location, speed, weather, type of road, or type of obstacle;
    applying, using at least one data processor, a discriminator network of a generative adversarial network to detect when the vehicle encounters an out of operational design scenario by processing the received scenario to generate an output indicating whether the received scenario corresponds to the out of operational design scenario, wherein the output of the discriminator network comprises a probability map indicating regions of the environment associated with a probability of being an out of operational design domain and the discriminator network is trained to distinguish between the received scenario and one or more synthesized scenarios generated by a trained generator network of the generative adversarial network; and
    controlling, using the at least one data processor, a motion of the vehicle in response to the output of the trained discriminator network indicating that the received scenario corresponds to the out of operational design domain scenario, wherein regions identified as being out of operational design domain based on the output of the discriminator network are avoided as the vehicle navigates in its environment.

2. The method of claim 1, wherein the generative adversarial network is trained to generate the one or more synthesized scenarios based at least on one or more driving logs representative of one or more true scenarios.

3. The method of claim 1, further comprising:
    sending, using the at least one data processor, a remote vehicle assistance request in response to the output of the trained discriminator network indicating that the received scenario corresponds to the out of operational design domain scenario.

4. The method of claim 1, wherein the controlling the motion of the vehicle in response to the output of the trained discriminator network indicating that the received scenario data corresponds to the out of operational design domain scenario includes at least one of decelerating and braking.

5. The method of claim 1, wherein controlling the motion of the vehicle includes avoiding, based at least on the probability map output by the trained discriminator network, one or more regions of the plurality of regions having an above-threshold probability being out of operational design domain.

6. The method of claim 1, wherein the generative adversarial network is trained based on training data comprising one or more of a random noise, a map, and raw sensor data.

7. The method of claim 1, further comprising:
    identifying, using the at least one data processor and based at least on an output of the trained discriminator network, one or more scenarios encountered by the vehicle that have an above-threshold probability of being a synthesized scenario; and
    updating, using the at least one data processor and based at least on the one or more scenarios, a perception system of the vehicle.

8. The method of claim 1, further comprising:
    determining, using the at least one data processor and based at least on the output of the trained discriminator network, a quantity of out of operational design domain scenarios encountered by the vehicle in a new location.

9. The method of claim 1, wherein the trained discriminator network outputs a first probability of the vehicle being in the out of operational design domain scenario for a first time period and/or a first location, wherein the trained discriminator network further outputs a second probability of the vehicle being in the out of operational design domain scenario for a second time period and/or a second location, and wherein the output of the trained discriminator network is determined based at least on the first probability and the second probability.

10. The method of claim 9, wherein the output of the trained discriminator network is determined by fusing at least the first probability and the second probability.

11. The method of claim 10, wherein the first probability and the second probability are fused by applying one or more of Bayesian fusion, Dempster-Shafer fusion, Yager's combination rule, Dubois-Prade combination rule, Denoeux's cautious rule.

12. The method of claim 1, further comprising:
    determining an uncertainty associated with the output of the trained discriminator network; and
    adjusting, based at least on the uncertainty, the output of the trained discriminator network.

13. The method of claim 12, wherein the uncertainty associated with the output of the trained discriminator network comprises an uncertainty associated with a first probability of the vehicle being in the out of operational design domain scenario and/or a second probability of the vehicle not being in the out of operational design domain scenario.

14. The method of claim 12, wherein the uncertainty associated with the output of the trained discriminator network is determined by applying an evidential classification and/or a temperature scaling for probability calibration.

15. The method of claim 1, further comprising:
training, using at least one data processor, the generative adversarial network including the generator network and the discriminator network.

16. A system, comprising:
at least one data processor; and
at least one memory storing instructions, which when executed by the at least one data processor, result in operations comprising:
receiving a scenario comprising conditions encountered by a vehicle as it navigates in an environment, wherein a condition comprises at least one of a location, speed, weather, type of road, or type of obstacle;
applying a discriminator network of a generative adversarial network to detect when the vehicle encounters an out of operational design scenario by processing the received scenario to generate an output indicating whether the received scenario corresponds to the out of operational design scenario, wherein the output of the discriminator network comprises a probability map indicating regions of the environment associated with a probability of being an out of operational design domain and the discriminator network is trained to distinguish between the received scenario and one or more synthesized scenarios generated by a trained generator network of the generative adversarial network; and
controlling a motion of the vehicle in response to the output of the trained discriminator network indicating that the received scenario corresponds to the out of operational design domain scenario, wherein regions identified as being out of operational design domain based on the output of the discriminator network are avoided as the vehicle navigates in its environment.

17. The system of claim 16, wherein the generative adversarial network is trained to generate the one or more synthesized scenarios based at least on one or more driving logs representative of one or more true scenarios.

18. The system of claim 16, wherein the operations further comprise:
sending, using the at least one data processor, a remote vehicle assistance request in response to the output of the trained discriminator network indicating that received scenario [corresponds to the out of operational design domain scenario.

19. The system of claim 16, wherein the controlling the motion of the vehicle in response to the output of the trained discriminator network indicating that the received scenario data corresponds to the out of operational design domain scenario includes at least one of decelerating and braking.

20. The system of claim 16, wherein controlling the motion of the vehicle includes avoiding, based at least on the probability map output by the trained discriminator network, one or more regions of the plurality of regions having an above-threshold probability being out of operational design domain.

21. The system of claim 16, wherein the generative adversarial network is trained based on training data comprising one or more of a random noise, a map, and raw sensor data.

22. The system of claim 16, wherein the operations further comprise:

identifying, based at least on an output of the trained discriminator network, one or more scenarios encountered by the vehicle that have an above-threshold probability of being a synthesized scenario;
and updating, based at least on the one or more scenarios, a perception system of the vehicle.

23. The system of claim 16, wherein the operations further comprise:
determining, using the at least one data processor and based at least on the output of the trained discriminator network, a quantity of out of operational design domain scenarios encountered by the vehicle in a new location.

24. The system of claim 16, wherein the trained discriminator network outputs a first probability of the vehicle being in the out of operational design domain scenario for a first time period and/or a first location, wherein the trained discriminator network further outputs a second probability of the vehicle being in the out of operational design domain scenario for a second time period and/or a second location, and wherein the output of the trained discriminator network is determined based at least on the first probability and the second probability.

25. The system of claim 24, wherein the output of the trained discriminator network is determined by fusing at least the first probability and the second probability.

26. The system of claim 16, wherein the operations further comprise:
determining, by applying an evidential classification and/or a temperature scaling for probability calibration, an uncertainty associated with the output of the trained discriminator network; and
adjusting, based at least on the uncertainty, the output of the trained discriminator network.

27. A non-transitory computer readable medium storing instructions, which when executed by at least one data processor, result in operations comprising:
receiving a scenario comprising conditions encountered by a vehicle as it navigates in an environment, wherein a condition comprises at least one of a location, speed, weather, type of road, or type of obstacle;
applying a discriminator network of a generative adversarial network to detect when the vehicle encounters an out of operational design scenario by processing the received scenario to generate an output indicating whether the received scenario corresponds to the out of operational design scenario, wherein the output of the discriminator network comprises a probability map indicating regions of the environment associated with a probability of being an out of operational design domain and the discriminator network is trained to distinguish between the received scenario and one or more synthesized scenarios generated by a trained generator network of the generative adversarial network; and
controlling a motion of the vehicle in response to the output of the trained discriminator network indicating that the received scenario corresponds to the out of operational design domain scenario, wherein regions identified as being out of operational design domain based on the output of the discriminator network are avoided as the vehicle navigates in its environment.

28. A method, comprising:
training, using at least one data processor, a generative adversarial network comprising a generator network and a discriminator network, wherein the generator network is trained to generate one or more synthesized scenarios, and the discriminator network is trained to distinguish between received scenario and the one or more synthesized scenarios generated by the generator network;

applying, using the at least one data processor, the trained discriminator network to the received scenario comprising conditions encountered by a vehicle as it navigates in an environment, wherein an output of the trained discriminator network comprises a probability map indicating regions of the environment associated with a probability of being an out of operational design domain; and controlling, using the at least one data processor, a motion of the vehicle in response to the output of the trained discriminator network indicating that the received scenario corresponds to an out of operational design domain scenario, wherein regions identified as being out of operational design domain based on the output of the discriminator network are avoided as the vehicle navigates in its environment.

* * * * *